Sept. 21, 1965   B. L. SHELY   3,207,602

COPYSHEET AND METHOD FOR MAKING COPIES THEREFROM

Filed Dec. 29, 1961

INVENTOR.
BENJAMIN L. SHELY

BY

United States Patent Office 3,207,602
Patented Sept. 21, 1965

3,207,602
COPYSHEET AND METHOD FOR MAKING COPIES THEREFROM
Benjamin L. Shely, White Bear Lake, Minn., assignor to Minnesota Mining and Manufacturing Company, St. Paul, Minn., a corporation of Delaware
Filed Dec. 29, 1961, Ser. No. 169,697
20 Claims. (Cl. 96—27)

This invention relates to a novel copysheet construction permitting thermographic prints to be made from a projected light image. In another aspect this invention relates to a method for rapidly obtaining one or more thermographic copies of a light image. In still another aspect this invention relates to a copysheet which varies in infrared absorbance upon exposure to radiation other than infrared.

One current commercial thermographic technique for image reproduction utilizes a graphic original having thereon areas which differ in their ability to absorb infrared light, e.g., an ordinary typewritten page. This visible image is converted to a thermal image under the influence of brief and intense infrared irradiation. A thermally sensitive sheet is placed in intimate contact with the graphic original during the irradiation step and is selectively colored, e.g., by chemical reaction, when the adjacent infrared absorbing areas reach a certain temperature. As used herein, this thermographic process will also be referred to as "infrared thermographic copying." However, specialized techniques have usually been required to produce thermographic copies of a light image, such as, for example, a projected light image from a microfilm transparency.

It is therefore an object of this invention to provide a novel method for rapidly preparing an infrared thermographic copy of a projected light image.

Another object of this invention is to provide a novel sheet construction which varies in infrared absorptivity upon exposure to irradiation other than infrared and which can be reproduced by infrared thermographic techniques.

Still another object of this invention is to provide a reusable copysheet which can be used to translate a light image into an infrared absorptive image for infrared thermographic image copying without requiring intermediate development steps.

Yet another object of this invention is to provide a copysheet, which after exposure to a light image can be used without further development as a master to prepare a plurality of thermographic copies.

A further object is to provide a copysheet which can be exposed to a light image and thermographically developed to produce a visible image thereon.

Other objects and advantages will be apparent from the following disclosure.

Figure 1:
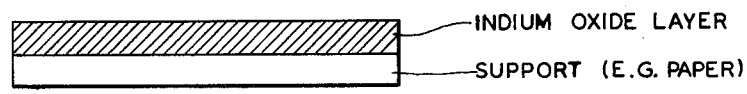
FIGURE 1 is a cross sectional view of a copysheet according to this invention, suitable for use as a master sheet for making multiple copies.
Figure 2:
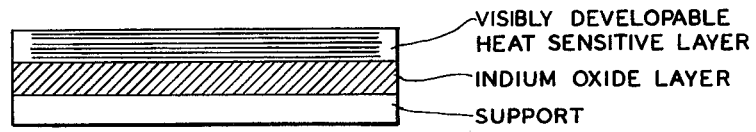
FIGURE 2 is a cross sectional view of a copysheet according to this invention which can be developed by infrared thermographic techniques to produce a visible reproduction of a light image.

The copysheet of this invention comprises indium oxide and a support therefor, the copysheet construction having low thermal conductivity, such property being necessary for infrared thermographic copying of a differential infrared absorptive image thereon. It has been found that indium oxide is one material which upon exposure to various types of irradiation develops a marked change in its infrared absorption characteristics. This can be utilized by providing a copysheet construction containing indium oxide, preferably in particulate form, and a suitable support. Such a copysheet, after dark adaptation and exposure to various forms of irradiation, e.g., a light image, develops a differential infrared absorption pattern corresponding to the light image, the indium oxide in the irradiated areas having significantly increased infrared absorptivity. This differential absorption pattern, though not permanent in nature, can be used in the preparation of one or more copies by known infrared thermographic techniques, using the indium oxide sheet as a master.

Although the useful life of such absorption pattern in the indium oxide copysheet varies with such factors as the exposure, etc., the copies produced therefrom within about one hour after exposure have the best contrast. Since the informatiton storage in the indium oxide copysheet is not permanent, these copysheets can be reused repeatedly. If erasure of the stored information is desired, it may be accomplished by exposing the indium oxide to negative ions from a corona discharge or by briefly heating the indium oxide sheet to an elevated temperature, e.g., over 100° C. Because of their light sensitivity these copysheets are maintained under dark conditions until used.

Indium oxide may be incorporated into the copysheets of this invention in a variety of ways. In one preferred embodiment, indium oxide powder may be bonded to a backing sheet by dispersing the powder in a binder matrix and coating the backing sheet with the oxide-binder mixture. Any suitable binder or adhesive material may be used, e.g., gelatin, butadiene-styrene copolymers, polystyrene and other organic and inorganic film forming compounds. If a relatively porous material, e.g., paper, fabric, etc., is selected as the support, the indium oxide powder may be contained within the support, either with or without an added binder. The support may itself serve as a binder for the indium oxide, e.g., a polyethylene terephthalate film having indium oxide embedded therein. In some instances it may be desirable to provide one or more additional coatings or layers to protect the integrity of the sheet construction, and any film forming material having good infrared transmissivity, e.g., gelatin, polyvinyl alcohol, glass, polyvinyl chloride, etc., can be used for this purpose. It is also essential that the construction permit exposure of the indium oxide to the activating radiation. Thus, when visible light is used to activate the indium oxide, any additional coatings superimposed between the light source and the indium oxide must be essentially transparent and, for optimum infrared thermographic copying thereof, are preferably as thin as practical. One or more of the additional coatings may also contain heat sensitive developer material, which permits the exposed copysheet to be thermographically developed by subjecting the sheet to brief and intense infrared irradiation, visible development taking place by color change in those areas of the heat sensitive coating adjacent to the highly infrared absorptive areas of the indium oxide. In another embodiment the heat sensitive developer materials can be incorporated directly into the indium oxide layer or the suport to provide a unitary construction which can be exposed to a light image to produce a differential infrared absorption latent image and developed thermographically in the above manner to produce a corresponding visible image. Simultaneous exposure to a light image and also uniform exposure to infrared irradiation can be used to provide a one-step print. Still another embodiment includes a vaporizable image-forming reactant in the indium oxide copysheet construction, preferably in one of the outermost layers, which is vaporized from the infrared absorptive areas during the brief and intense exposure to infrared radiation and is transferred in vapor form to an adjacent receptor surface and condensed thereon to form a visible image. Such vaporizable image forming reactant may form a colored or visible image by reacting with a color forming reactant on the receptor surface, or it may be itself strongly colored in contrast to said receptor surface and form a visible image upon condensation without further reaction. A suitable illustrative vaporizable image forming material of the former type is gallic acid (ferric stearate on receptor surface). A suitable illustrative vaporizable image forming material of the latter type is quinalizarine green dye.

In still another embodiment an indium oxide layer can be provided on an electrically insulative backing by exposing the surface of a suitable support or sheet, such as glass, to indium oxide vapor produced by burning indium metal in air, thereby forming a thin indium oxide coating on the support.

Although the indium oxide copysheet can be prepared in various forms and embodiments, as discussed above, the overall sheet construction should have sufficiently low lateral thermal conductivity to permit effective infrared thermographic copying of the differential infrared absorptive image thereon. This necessarily precludes the use of certain constructions. For example, the indium oxide layer cannot be bonded to continuous layers having relatively high lateral thermal conductivity, such as aluminum foil or metal plates, without severe distortion or blurring of the infrared thermographic copies. The use of such constructions adversely affects their ability to serve as master copysheets in infrared thermographic duplicating processes because of poor contrast, inadequate control of the thermographic development, etc. In addition, the unexposed or nonirradiated copysheet construction must be essentially nonabsorptive of infrared irradiation relative to its infrared absorption characteristics after irradiation, the materials of the construction being preferably selected and employed to provide a maximum differential in infrared absorbency between the irradiated and unirradiated portions of the copysheet. For this reason, significant quantities of either highly thermally conductive or highly infrared absorptive materials (except indium oxide) are generally undesirable in the copysheets of this invention, particularly in the form of a continuous film or layer. A continuous, electrically conductive layer, e.g., metal, is therefore preferably avoided.

Any of the various forms of irradiation which alter the infrared absorption characteristics of indium oxide are suitable for activation of the indium oxide copysheets. The effect of various types of irradiation on the infrared absorption characteristics of indium oxide can be readily ascertained by measuring the infrared (0.6 to 15 microns wavelength) reflectance of an indium oxide film in a double monochronometer, both with and without external irradiation of the film surface. If the external irradiation results in at least a 3 percent change in the infrared reflectance, the external irradiation may be used to impress information on the indium oxide copysheets of this invention. The infrared reflectance reading may be taken simultaneously with or immediately after exposure to external irradiation, the latter technique being preferable when the external irradiation being tested for its ability to alter indium oxide's infrared absorbency is itself in or near the wavelength of the monochronometer infrared light source.

Electron, proton and neutron beams can be used as a source of suitable activating irradiation. Actinic irradiation of wavelength shorter than infrared (e.g., yellow) particularly in the visible and ultraviolet region, is generally preferred. When electron beam irradiation is used as the information carrier (e.g., using the apparatus described in British Patent 850,985), a visibly detectable discoloration of the indium oxide can sometimes be observed in the irradiated areas. Similarly, after protracted illumination with light from an incandescent lamp, a faint image visible to the naked eye may sometimes be observed on the indium oxide surface. However, such visible image is transitory, and it is unnecessary that it be clearly visible for the production of satisfactory thermographic prints from the indium oxide master copysheets.

The spectral response of the indium oxide copysheets may be enhanced by dye sensitization. Illustrative dye sensitizer classes are: diphenylmethanes (e.g., auramine, C.I. 41000), acridines (e.g., Phosphine R., C.I. 46045), thiazoles (e.g., Thioflavine S), xanthenes (e.g. Erythrosine, C.I. 45430), thiazoles (e.g., Seto Flavine T., C.I. 49005), cyanines (e.g., Dicyanine A), etc. Usually from about 0.01 to about 0.1 weight percent of dye sensitizer, based on weight of indium oxide, is suitable to obtain the desired improvement in spectral response. Without the use of dye sensitizer the response of indium oxide to actinic light is mostly in the region of green and shorter wavelengths. Dye sensitizers can extend the sensitivity of the indium oxide copysheet into the red region of the spectrum and generally provide panchromatic response.

*Example I*

The following formulation was prepared and coated onto a polyethylene terephthalate resin film backing after an extended period of ball milling. Formulation: powdered indium oxide, 40 grams; Pliolite S-7 (30 wt. percent of a 30/70 mol ratio butadiene-styrene copolymer in toluene), 30 grams; methylethyl ketone, 30 grams. The coating was prepared by applying the above formulation to the backing using a wet coating thickness of 2 mils. Exposure of the dried and dark-adapted coating through a photographic transparency using an ultraviolet source for a period of 5 to 10 seconds, or to a 500 watt tungsten source for 10 seconds, was followed by preparation of infrared thermographic copies in a commercial thermographic copying machine, using the exposed indium oxide coated sheet as master or graphic original.

The above procedure was also followed with the addition of 1 milliliter of a 2 weight percent solution of sensitizing dye in ethyl alcohol, to the slurry during ball-milling and about 15 minutes prior to removal of the slurry from the ball mill. Spectral sensitivity was improved in this manner.

*Example II*

An indium oxide copysheet, as described in Example I, was exposed to visible light to obtain a differential infrared absorptive image thereon. The infrared absorptive image was erased by heating the copysheet on a hot bar at 140° C. for five seconds. Heating above 100° C. is desirable for erasure in less than about 10 seconds. The erased copysheet can be reused.

*Example III*

Image reversal can also be achieved with the indium copysheets of this invention, as follows:

An indium oxide copysheet is uniformly exposed to light to make the entire sheet more infrared absorptive. A typewritten page was placed on top of the uniformly exposed copysheet, and both sheets were then passed through a commercial "Thermo-Fax" brand thermographic copying machine (a product of Minnesota Mining and Manufacturing Company, St. Paul, Minnesota). The heat generated by the radiation absorptive inks on the typewritten page effectively caused erasure of, i.e. lowering of infrared absorbency of, those adjacent areas of the indium oxide copysheet. The indium oxide copysheet was then separated from the typewritten original and was used as a master to make a copy on commercial heat sensitive paper in the same thermographic copying machine employed above. The resulting visible image on the heat sensitive paper was a negative print of the positive original.

*Example IV*

A mixture of 60 grams of indium oxide ($In_2O_3$) and 33.3 grams of 30% solids, 30/70 mol ratio butadiene-styrene copolymer in toluene was carefully stirred together. To this was added 150 cc. of toluene. The resulting fluid mixture was ballmilled overnight and coated on 9 mil cardboard using a coating knife and a 20 mil wet coating thickness. All operations were performed under such conditions as to avoid exposure of the pigment, pigment-resin mix, or the final film to light having wavelengths shorter than yellow. The coated sheets were usable immediately after the escape of the solvent (about a minute).

A 300 watt projector was used to illuminate the indium oxide coating of the above sheet, an arrow-shaped hole in an opaque material being used to provide the image. With the lens of the projector 1½ inches from the copysheet surface, exposures were made on various samples using from about 15 seconds to about 2 minutes exposure time. After exposure, the indium oxide sheet was placed in contact with conventional heat sensitive copy paper and printed in a commercial thermographic copying device by brief exposure to intense radiation rich in infrared. Useful thermographic development techniques as well as various illustrative heat sensitive copysheet structures and formulations are disclosed in Miller et al., U.S. Patents Nos. 2,663,654-7. Apparatus suitable for carrying out this step of the thermographic development process is also described in Miller's U.S. Patents Nos. 2,740,895-6.

*Example V*

The copysheet of Example I was coated with a buff-colored heat sensitive formulation containing ferric stearate and the alcohol insoluble addition product of hexamethylenetetramine and gallic acid, together with small amounts of ethyl cellulose binder. This sheet was exposed to visible light from an incandescent lamp through a photographic transparency, then briefly exposed to intense infrared radiation contained in a commercial thermographic copying machine. The invisible infrared absorption image in the indium oxide copysheet was amplified by thermal development of the heat sensitive reactants in the buff overcoating. A negative print was obtained with good definition. A positive print was obtained by substituting for the buff sheet formulations a heat sensitive composition in which a dark intense color is destroyed upon heating, namely ferric stearate-to-butyl catechol complex (blue) and citric acid with small amount of ethyl cellulose binder. The heat sensitive compositions of this example can also be incorporated into the indium oxide layer of the copysheet construction and developed thermographically to give similar results.

*Example VI*

The following formulation was prepared and coated onto a 2 mil polyethylene terephthalate film after an extended period of ballmilling:

|   | Grams |
|---|---|
| Powdered indium oxide | 40 |
| Pliolite S-7 (30 wt. percent of a 30/70 mol ratio butadiene-styrene copolymer in toluene) | 30 |
| Methyl ethyl ketone | 30 |

A 2 mil wet coating thickness was used in the coating step. After the sheet had dried it was scanned with an electron beam having a 2 mil spot size, under the following conditions:

| Pressure | 0.3 micron mercury absolute. |
|---|---|
| Voltage (final acceleration) | 18 kv. |
| Current (cathode) | 100 ma. (average). |
| Exposure | 1 TV frame of 1/30 sec. 10 TV frames. 100 TV frames. |

Even after exposure to but one TV frame (1/30 sec.) heat sensitive copies were produced therefrom in a commercial thermographic copying machine using the indium oxide sheet as an original and using commercially available heat sensitive copy paper.

Various other embodiments and modifications will be apparent to those skilled in the art from the foregoing disclosure without departing from the spirit and scope of this invention.

I claim:

1. A process for providing a master sheet for making thermographic copies of a radiant image which comprises exposing to an actinic radiant image a copysheet having an actinic radiation exposable indium oxide containing layer and a support therefor, said copysheet having sufficiently low lateral thermal conductivity to permit its use in a thermographic copying process, thereby rendering said copysheet more highly infrared absorptive in the irradiated portions.

2. The process of claim 1 in which said radiant image contains actinic irradiation of wavelength shorter than infrared.

3. The process of claim 1 in which said radiant image contains light of wavelength shorter than yellow.

4. The process of claim 1 in which said radiant image contains ultraviolet light.

5. A process for providing thermographic copies of a radiant image which comprises exposing to an actinic radiant image a copysheet having an actinic radiation exposable indium oxide containing layer and a support therefor, said copysheet having sufficiently low lateral thermal conductivity to permit its use in a thermographic copying process, thereby rendering said copysheet more highly infrared absorptive in the irradiated portions, and using the exposed copysheet as a master to make thermographic copies thereof.

6. A copysheet capable of converting a light image into an infrared absorptive image which comprises a support and a layer containing discrete particles of light exposable indium oxide uniformly distributed in a binder matrix, said copysheet having low lateral thermal conductivity, said copysheet being capable of change in infrared absorbency upon exposure to actinic irradiation of wave length shorter than infrared.

7. A copysheet capable of converting a light image into an infrared absorptive image which comprises a flexible support, a light exposable indium oxide containing layer and a visibly developable heat sensitive material adjacent said indium oxide containing layer, said copysheet having sufficiently low lateral thermal conductivity to permit thermographic copying of an infrared absorptive image thereon, said copysheet being capable of change in infrared absorbency upon exposure to actinic irradiation of wave length shorter than infrared.

8. A copysheet capable of converting a light image into an infrared absorptive image which comprises a flexible support, and a layer containing light exposable indium oxide and a visibly developable heat sensitive material, said copysheet having sufficiently low lateral thermal conductivity to permit thermographic copying of an infrared absorptive image thereon, said copysheet being capable of change in infrared absorbency upon exposure to actinic irradiation of wave length shorter than infrared.

9. A process for providing thermographic copies of a radiant image which comprises (a) uniformly exposing to actinic radiant energy a copysheet having an actinic radiation exposable indium oxide containing layer and a support therefor, said copysheet having sufficiently low lateral thermal conductivity to permit its use in a thermographic copying apparatus, thereby uniformly rendering said copysheet more highly infrared absorptive, (b) thermally and selectively reducing the infrared absorptivity imagewise on said copysheet, and (c) using said copysheet as a master to make thermographic copies thereof.

10. The process of claim 9 in which said copysheet is subsequently exposed to a corona discharge to erase any infrared absorptive image thereon.

11. The process of claim 9 in which said copysheet is subsequently heated to an elevated temperature to erase any infrared absorptive image thereon.

12. The process of claim 5 in which said copysheet is subsequently exposed to a corona discharge to erase any infrared absorptive image thereon.

13. The process of claim 5 in which said copysheet is subsequently heated to an elevated temperature to erase any infrared absorptive image thereon.

14. A copysheet capable of converting a radiant image into an infrared absorptive image which comprises a layer containing actinic radiation exposable indium oxide powder uniformly distributed therein and a support therefor, said copysheet having low lateral thermal conductivity and being capable of change in infrared absorbency upon exposure of said indium oxide to actinic irradiation of wavelength shorter than infrared.

15. A copysheet capable of converting a radiant image into an infrared absorptive image which comprises a layer containing actinic radiation exposable, discrete particles of indium oxide uniformly distributed therein, said indium oxide containing layer being contiguous only to laterally electrically insulative layers, said copysheet having sufficiently low lateral thermal conductivity to permit thermographic copying of an infrared absorptive image thereon and said copysheet being capable of change in infrared absorbency upon exposure to actinic irradiation of wavelength shorter than infrared.

16. A copysheet capable of converting a radiant image into an infrared absorptive image which comprises a layer container actinic radiation exposable, discrete particles of indium oxide uniformly distributed therein and an electrically insulative support therefor, said copysheet having sufficiently low lateral thermal conductivity to permit thermographic copying of an infrared absorptive image thereon and being capable of change in infrared absorbency upon exposure to actinic irradiation of wavelength shorter than infrared.

17. A copysheet capable of converting a radiant image into an infrared absorptive image which comprises a layer containing actinic radiation exposable, discrete particles of indium oxide uniformly distributed therein, an electrically insulative support, and a visibly developable heat sensitive layer adjacent said indium oxide containing layer, said copysheet having sufficiently low lateral thermal conductivity to permit thermographic copying of an infrared absorptive image thereon and being capable of change in infrared absorbency upon exposure to actinic irradiation of wavelength shorter than infrared.

18. A copysheet capable of converting a radiant image into an infrared absorptive image which comprises a layer containing actinic radiation exposable, indium oxide powder uniformly distributed therein, said layer being bonded to the surface of an electrically insulative support therefor, said copysheet having sufficiently low lateral thermal conductivity to permit thermographic copying of an infrared absorptive image thereon and being capable of change in infrared absorbency upon exposure to actinic irradiation of wavelength shorter than infrared.

19. A copy sheet capable of converting a radiant image into an infrared absorptive image which comprises actinic radiation exposable indium oxide powder in a porous electrically insulative support, said copysheet having sufficiently low lateral thermal conductivity to permit thermographic copying of an infrared absorptive image thereon and being capable of change in infrared absorbency upon exposure to actinic irradiation of wavelength shorter than infrared.

20. An exposed copysheet capable of use as a master in making thermographic copies which comprises a layer containing actinic radiation exposable indium oxide powder uniformly distributed therein and a support therefor, said copysheet having sufficiently low lateral thermal conductivity to permit its use in a thermographic copying process and said indium oxide containing layer containing a differential infrared absorptive image.

References Cited by the Examiner

UNITED STATES PATENTS

| | | | |
|---|---|---|---|
| 2,694,761 | 11/54 | Tarnopol | 117—211 |
| 2,904,457 | 9/59 | Fridrich | 117—93.3 |
| 2,932,590 | 4/60 | Barrett | 117—138.8 |
| 2,995,465 | 8/61 | Richey | 117—36.8 |
| 3,028,254 | 4/62 | Grant | 117—36.8 |

WILLIAM D. MARTIN, *Primary Examiner.*

RICHARD D. NEVIUS, MURRAY KATZ, *Examiners.*